United States Patent [19]

Spector

[11] Patent Number: 4,994,832
[45] Date of Patent: Feb. 19, 1991

[54] PHOTOGRAPHIC TECHNIQUE FOR PRODUCING PICTURES OF INDIVIDUALS JOINTLY WITH CHARACTERS

[76] Inventor: Donald Spector, 380 Mountain Rd., Union City, N.J. 07087

[21] Appl. No.: 459,642

[22] Filed: Jan. 2, 1990

[51] Int. Cl.$^5$ ............................................. G03B 35/00
[52] U.S. Cl. ................................................. 354/110
[58] Field of Search ............... 354/108, 110, 111, 122, 354/125, 126, 202 FF, 291, 295, 100, 103, 120; 352/46, 55, 90, 87; 355/39

[56] References Cited

U.S. PATENT DOCUMENTS

| | | | |
|---|---|---|---|
| 4,317,626 | 3/1982 | Poshkus | 354/108 |
| 4,352,555 | 10/1982 | Dobbs et al. | 354/291 |
| 4,827,291 | 5/1989 | Guez | 354/125 |

*Primary Examiner*—L. T. Hix
*Assistant Examiner*—David M. Gray
*Attorney, Agent, or Firm*—Michael Ebert

[57] ABSTRACT

A photographic technique for producing a picture in which an individual whose picture is taken is seen jointly with a figurative character in such a way as to establish an apparent relationship therebetween. To carry out this technique, a camera is loaded with a light-sensitive film whose successive frames are partially pre-exposed so that each frame contains a latent image of a character. When the camera is set to place a particular frame behind the lens, the individual is then posed before the camera to occupy a predetermined position relative to the latent frame image. Upon actuation of the camera, a latent image of the individual is formed on the frame in juxtaposition to that of the character and the exposure of the frame is completed. The film is then developed and printed to provide the desired picture.

6 Claims, 2 Drawing Sheets

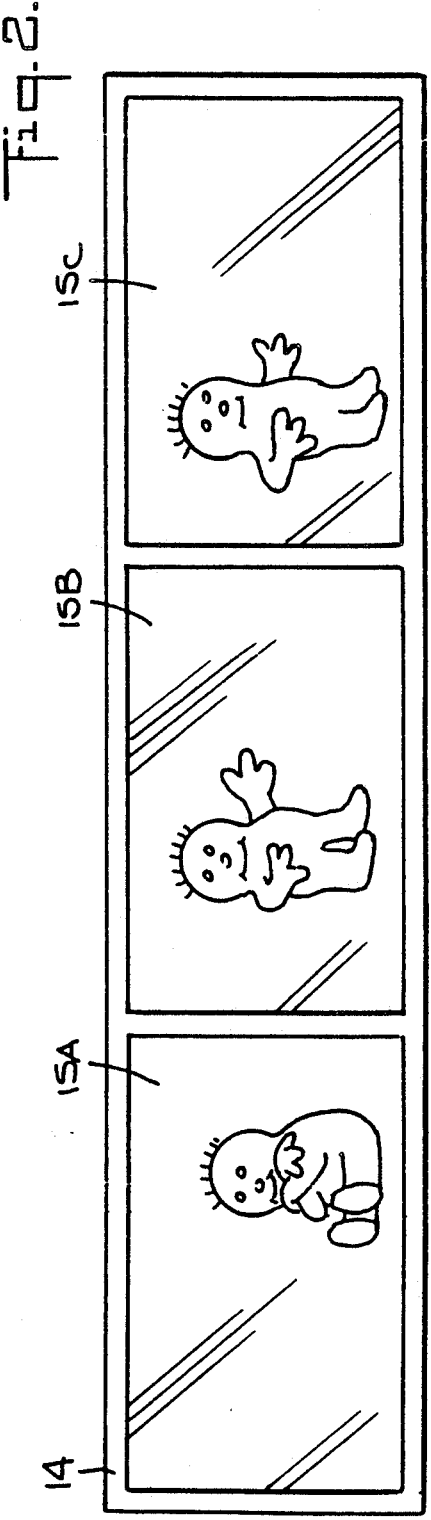

4,994,832

PHOTOGRAPHIC TECHNIQUE FOR PRODUCING PICTURES OF INDIVIDUALS JOINTLY WITH CHARACTERS

BACKGROUND OF INVENTION

1. Field of the Invention

This invention relates generally to photography, and in particular to a technique which makes use of a camera loaded with film whose successive frames are partially pre-exposed to contain latent images thereon of figurative characters whereby when individuals are then photographed, the individuals are seen in the resultant pictures in juxtaposition to the characters so as to establish an apparent relationship therebetween.

2. Status of Prior Art:

A camera consists essentially of a light-proof container housing a light-sensitive film and provided with a lens to admit light and focus it on the film. In a standard commercial camera, an adjustable diaphragm is included as well as a shutter and a view-finder. The diaphragm can be adjusted to vary the diameter of the lens aperture and hence the amount of admitted light. The shutter controls the length of time the film is exposed to light.

Low-cost, disposable cameras are now available which contain a film cartridge whose successive frames are advanced relative to a fixed focus lens after each picture is taken. When all frames have been exposed, the cartridge is then removed from the body of the camera which is discarded.

Such disposable cameras are particularly popular with young children; for to operate the camera no training or skill is required, and all the child need do is to compose a picture through the viewfinder and then snap it.

In the contemporary world, characters such as MICKEY MOUSE hold great fascination for children. The term "character" ordinarily refers to a person in the cast of a drama or novel. But as the term is now popularly employed in the field of toys and playthings, it applies to a humanoid or animal-like figure that originated in a comic strip, a motion picture or a TV program and has since acquired the status of a recognized personality. Thus DONALD DUCK and MICKEY MOUSE are internationally known characters, as are the figures who populate the SESAME STREET TV series for children.

Perhaps the most acclaimed tourist attraction in the United States is Disney World in Orlando, Florida. One reason why cameras are omni-present at this resort is that actors disguised and dressed up as DISNEY characters roam the grounds and play with the children. These characters also pose with the children so that pictures can be taken of, say, a man-sized MICKEY MOUSE embracing a 6-year old child. Such pictures are treasured by children, for they establish a special relationship between the child and the character.

The line of demarcation between reality and imagination is not sharply drawn in a typical child. Some children look upon characters who people their imagination not as cardboard or synthetic figures but as living creatures. Hence a child may shower as much affection on a Minnie Mouse soft doll as on a dog or cat. But what children cannot presently do, unless at Disney World, is to take pictures in which they appear together with their favorite character.

SUMMARY OF INVENTION

In view of the foregoing, the main object of this invention is to provide a photographic technique for producing a picture in which an individual whose picture is taken is seen together with a figurative character in such a way as to establish an apparent relationship therebetween.

More particularly, an object of the present invention is to provide a technique of the above type which makes use of a conventional camera which is loaded by film whose successive frames are partially pre-exposed so that each frame contains a latent image of a character.

Also an object of the invention is to provide a camera for carrying out this technique which includes a viewfinder adapted to receive a movable strip having a succession of transparent slides thereon corresponding to the latent images on the film frames so that the user is then able to pose the individual to be photographed in a desired relation to the character image on a selected frame that will carry the individual's picture.

Yet another object of the invention is to provide a book illustrated by a series of pictures taken by the photographic technique and accompanied by a text appropriate to the pictures.

Briefly stated, these objects are attained in a photographic technique for producing a picture in which an individual whose picture is taken is seen jointly with a figurative character in such a way as to establish an apparent relationship therebetween. To carry out this technique, a camera is loaded with a light-sensitive film whose successive frames are partially pre-exposed so that each frame contains a latent image of a character.

When the camera is set to place a particular frame behind the lens, the individual is then posed before the camera to occupy a predetermined position relative to the latent frame image. Upon actuation of the camera, a latent image of the individual is formed on the frame in juxtaposition to that of the character and the exposure of the frame is completed. The film is then developed and printed to provide the desired picture.

BRIEF DESCRIPTION OF DRAWINGS

For a better understanding of the invention as well as other objects and further features thereof, reference is made to the following detailed description to be read in conjunction with the accompanying drawings, wherein:

FIG. 1 illustrates a picture taken by a photographic technique in accordance with the invention;

FIG. 2 shows a movable guide strip containing a succession of slides corresponding to the latent images on the partially-exposed frames on the film in the camera;

DESCRIPTION

Figure 3:
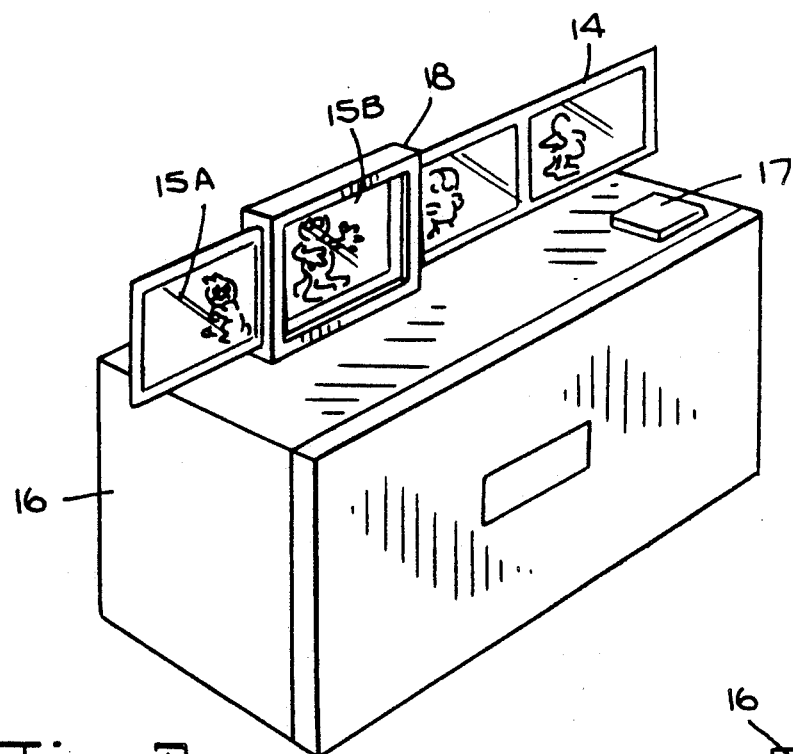
FIG. 3 shows, in rear view, a camera having a viewfinder in accordance with the invention for receiving the movable guide strip.

Referring now to FIG. 1, there is shown the print 10 of a picture taken by a photographic technique, in accordance with the invention. The picture includes a fanciful humanoid character 11, and an individual 12 who is so posed as to be seen in apparent dialogue with the character in a setting, including a tree 13.

The film used for this purpose may be in cartridge, reel or in any other conventional form, includes a pack of individual frames as in a "POLAROID" instant camera. Each frame in the sequence thereof is partially pre-exposed to produce a latent image of a character. It is essential that the film frame only be partially pre-exposed (i.e., half a normal full exposure), so that the same frame remains sensitive to light and can be further exposed to photograph the individual.

Assuming a film cartridge having a capacity of twelve frames and further assuming that the cartridge is intended to establish a relationship between a character, such as GARFIELD, with a given individual or with several individuals in different situations, then the character whose latent image is contained in each frame will be photographed in a different pose in each frame.

For this purpose, the character photographed is preferably not in two dimensional cartoon form, but is a three-dimensional, large scale effigy, so that his relationship with the individual appearing in the same photograph is more realistic. Thus for a MICKEY MOUSE character, one can use a large size MICKEY MOUSE doll whose arms and legs and all other movable members are adjustable so that the doll can be made to assume different expressive postures.

FIG. 2 illustrates a guide strip 14 carrying a series of transparencies or slides 15A, 15B, 15C, etc., the number of slides on the strip corresponding to the number of pre-exposed frames in the photographic film, each of which contain a latent image of the character in a different pose. Thus slide 15A shows the humanoid character in one pose, slide 15B in another, and slide 15C in still another.

Figure 4:
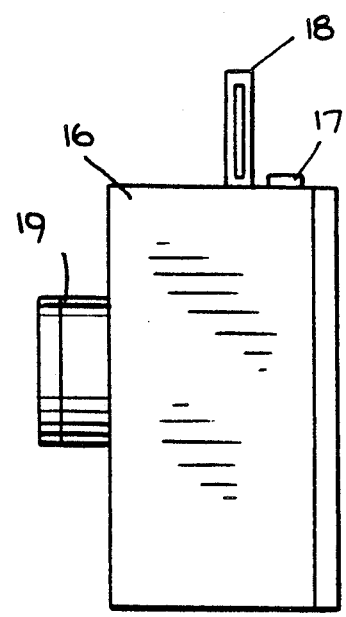
FIG. 4 is a side view of the camera.

The function of guide strip 14 is to assist the operator of the camera, such as camera 16 in FIGS. 3 and 4, which includes a shutter actuator button 17, to compose a picture having the character therein. To this end, camera 16 is provided with a viewfinder 18 having a channel therein to receive guide strip 14 which is axially shiftable to register any selected slide on the strip with the viewfinder.

When, therefore, the camera is set so that the first in a series of partially-exposed film frames is placed behind the camera lens 19, then guide strip 14 is positioned so that the first slide 15A lies within viewfinder 18. The character image on the first slide 15A corresponds to the latent image on the first film frame and has the same position therein. Hence if the character is close to one end of the film frame, it occupies the same position on the slide, and one looking through the viewfinder sees in effect where the latent character image appears on the film frame.

When, therefore, the operator who is about to take a picture to complete the exposure of the first film frame looks through viewfinder 18, he sees the scene through the first slide 15A and he can compose the picture by posing the individual in the scene to be photographed so that this individual has a desired interactive relationship with the character.

Thus in slide 15A, the humanoid character is seen with his arms (or front paws) crossed over each other, and the individual may be posed so that he appears to be looking at this character, and also has his arms crossed over each other. The operator can make his own choice as to how the individual being photographed is to interact with the character.

After the first picture is taken, then the second film frame in the camera is advanced to occupy a position behind the lens, and guide strip 14 is shifted to align the second slide in the series with the viewfinder, so that now the individual can be posed in a manner appropriate to the posture taken by the character in the second slide. This operation is repeated until all film frames are exposed. The film can then be removed from the camera for development and printing in the usual manner.

Since the film is pre-exposed, usually to about one half of its normal full exposure period for taking a picture, and the exposure of the film is completed when taking a picture of an individual, the resultant picture would under ordinary circumstances be somewhat underexposed both as to the character and the individual. But by the use of a film of the appropriate sensitivity, this underexposure can be compensated for to provide a picture of good quality.

Instead of a guide strip, the slides may be supported on a disc that is rotatable relative to a viewfinder, as in so-called "VIEW MASTER" slides. The camera may also be of the type in which the sensitive film frames are supported on a rotatable disc as in certain "KODAK" cameras. The light-sensitive film disc is indexed to a new frame after each picture is snapped and the operation of the film disc and the guide disc is coordinated.

In practice, consumers may be provided with a large choice of pre-exposed film cartridges or reels having different characters therein, and with guides appropriate thereto.

Figure 5:
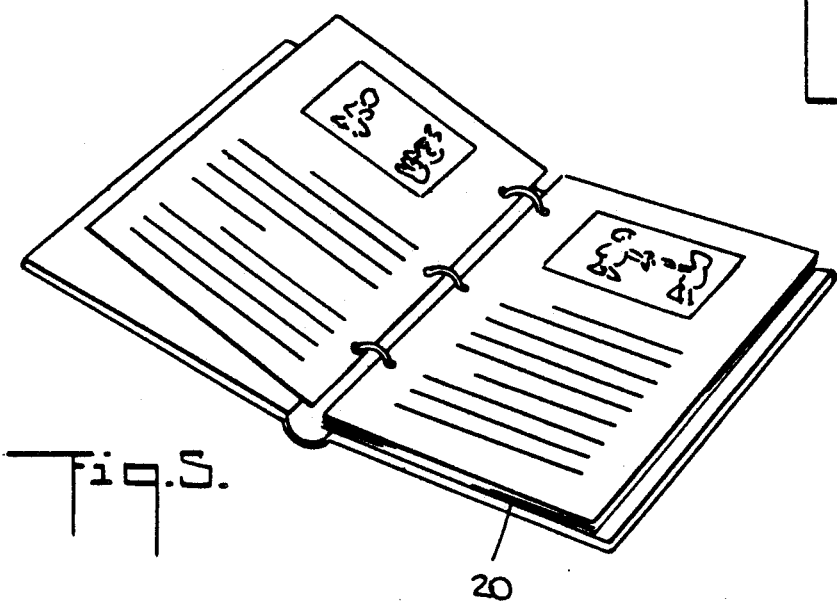
FIG. 5 is a book whose pages are illustrated by pictures produced by a technique in accordance with the invention and an accompanying text.

When a series of pictures are produced showing a child in a series of poses with a given character, one can paste or otherwise attach these pictures on different pages 20 of a loose leaf book, as shown in FIG. 5. The child can type or write on these pages a story of his own creation giving an account of adventures or events illustrated in the pictures. In this way, the child can produce a highly personalized story involving himself and the character.

While there has been shown and described a preferred embodiment of a photographic technique for producing pictures of individuals jointly with characters in accordance with the invention, it will be appreciated that many changes and modifications may be made therein without, however, departing from the essential spirit thereof.

I claim:

1. A technique for producing photographic pictures in each of which an individual whose picture is taken is seen jointly with a figurative character in such a way as to establish an apparent relationship therebetween, said technique comprising:

(a) loading a camera provided with a viewfinder with a light-sensitive film whose successive frames are partially pre-exposed so that each frame contains a latent image of a character at a predetermined position within the frame;

(b) placing a transparency slide in the viewfinder of an image that corresponds to that in the film frame then in a position to be exposed;

(c) taking pictures with the loaded camera of at least one individual to expose the successive frames so that a latent image of the individual seen through the slide in the viewfinder appears in juxtaposition with that of the image of the character on that frame in a position to be exposed which is then completely exposed; and (d) developing and printing the exposed film to provide pictures in each of which the individual appears next to a character.

2. A technique as set forth in claim 1, wherein said film is in cartridge form.

3. A technique as set forth in claim 1, wherein said camera is an instant camera and said frames are stacked in a pack.

4. A technique as set forth in claim 1, wherein said camera includes a viewfinder and said pictures are each taken through said viewfinder which has a transparency slide therein that corresponds to the latent image of the character.

5. A camera for producing pictures in each of which an individual whose picture is taken is seen jointly with a figurative character in such a way as to establish an apparent relationship therebetween, said camera being loaded with a light-sensitive film whose series of frames are partially pre-exposed so that each frame contains a latent image of the character at a predetermined position with the frame, said camera being provided with a viewfinder in which is inserted a transparency slide having an image that corresponds to that in the film frame than in a position to be exposed, said camera including shutter means that when the camera is actuated to take a picture of an individual seen through the slide, exposes a selected frame of the film to sufficient light to complete the exposure of the film.

6. A camera as set forth in claim 5, having a viewfinder provided with a channel in which is slidable a guide strip containing a like series of transparent slides each containing an image corresponding to the latent image on the related frame in the series.

* * * * *